Figure 3:
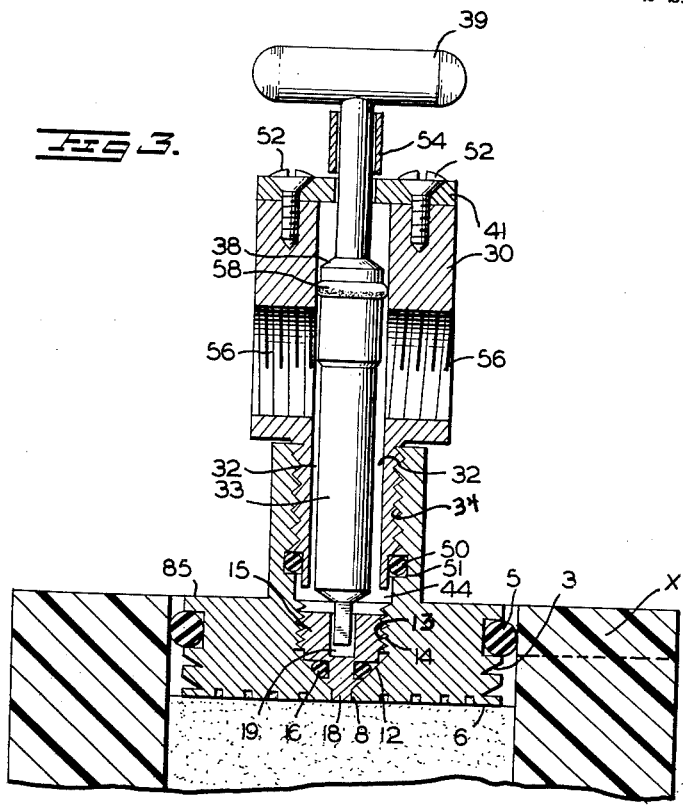

Dec. 4, 1962    R. L. OVERHULS    3,066,524
APPARATUS AND METHOD FOR MOUNTING CORE SPECIMENS
Filed March 4, 1959    2 Sheets-Sheet 1
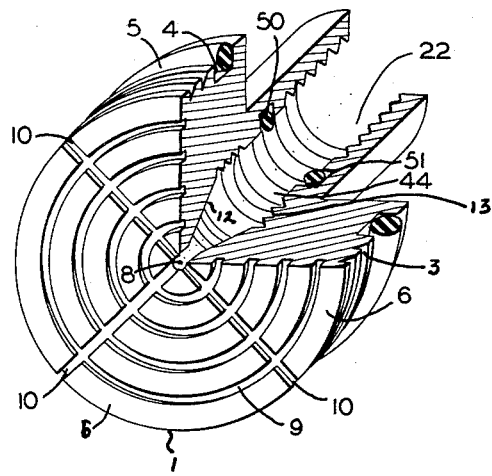
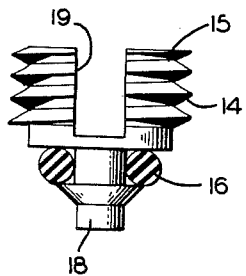
Robert L. Overhuls
INVENTOR.
BY Adams, Forward & McLean
ATTORNEYS Dec. 4, 1962 R. L. OVERHULS 3,066,524
APPARATUS AND METHOD FOR MOUNTING CORE SPECIMENS
Filed March 4, 1959 2 Sheets-Sheet 2

Robert L. Overhuls
INVENTOR.

BY Adams, Forward & McLean

ATTORNEYS

# United States Patent Office 3,066,524
Patented Dec. 4, 1962

3,066,524
APPARATUS AND METHOD FOR MOUNTING CORE SPECIMENS
Robert L. Overhuls, Tulsa, Okla., assignor to Sinclair Research, Inc., a corporation of Delaware
Filed Mar. 4, 1959, Ser. No. 797,259
12 Claims. (Cl. 73—38)

This invention relates to a method of mounting core specimens for use in fluid flow investigations, e.g. of core samples taken from oil and gas wells. This invention also relates to apparatus useful in mounting such core specimens and in the fluid flow investigations conducted with the specimens.

In drilling oil, gas and other types of wells, samples are taken of the various strata through which the wells are being drilled for the purpose of analyzing the core specimen or sample with respect to permeability, porosity, saturation and other similar studies. In order to determine these characteristics, the samples or cores are usually mounted within a casing or container. However, various difficulties have been encountered in the mounting of samples for core analysis since the mounting techniques involved require exacting procedures to obtain a tight-fitting casing about the sample. For example, in core analysis involving fluid flow investigations for permeability and porosity studies, if a tight seal is not obtained around the sample, the fluid being passed through the specimen will by-pass down the periphery of the core sample and flow between the casing and the specimen. It is evident that to increase the reliability of any data obtained, the passage of fluid must be limited to passage through the core itself.

Although various methods of mounting cores or samples have been suggested, including the mounting of the core in a plastic casing which, to a large extent, prevents fluid by-passing, such procedures still require securing two rigid, non-absorbent discs at the opposite ends of the sample through which the liquid enters and exits from the core sample. Usually the discs, or end plates, together with a resilient sealing ring or gasket are rigidly secured to the ends of the plastic sleeve or container by clamps, or screws, etc. so that the end plate compresses the gasket to form a tight seal. Although a comparatively tight seal may be obtained by this method, the disadvantages are obvious. For example, it is impossible to effectively seal against the gasket and face of the core at the same time; in other words, a gap will remain in which fluids are segregated by gravity and give erroneous displacement data; due to the gap or space existing between the face plate and core sample and the fact that fluid can invade the O-ring groove, it is virtually impossible to completely remove oil and water for dry weight measurements; and it is a tedious method since a number of extra steps are required to accomplish a satisfactory mounting. Similarly, if the sealing ring or gasket is not of a suitable material it will be affected by the test fluid and eventually deteriorate. Accordingly, an object of the present invention is the provision of a method for mounting core specimens wherein these disadvantages are avoided. Another object of the present invention is the provision of apparatus useful in mounting such core specimens as well as in the fluid flow investigations conducted with the specimens.

The operation of the method and description of the apparatus of this invention will be more clearly understood by reference to the drawings in which the apparatus is illustrated. When employed in the drawings, like numerals denote similar parts.

Figure 4:
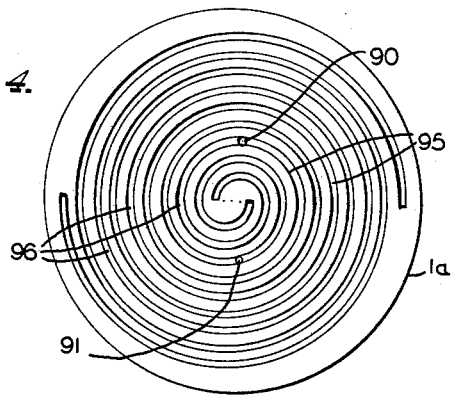

FIGURE 1 represents a sectional view extending through an end plate mechanism of the closure means used in accordance with this invention;

FIGURE 2 provides a side view of a valve plug employed in the closure means;

FIGURE 3 provides an elevational view, partly in section, showing an end piece connected to the end plate mechanism and mounted in a plastic casing containing a core sample; and FIGURE 4 provides a front view of a modified face plate adapted to enable an even distribution of 2 different fluids through the core sample.

Referring to FIGURE 1, there is shown circular end plate means 1 which is made of Monel metal, stainless steel, gold-plated brass or any other suitable material non-absorbent to liquids. The end plate comprises a back plate (shown as 85 in FIGURE 3) and a cylindrical face plate 6 having one or more concentric grooves 9 disposed uniformly therein and extending radially outward from a centrally located opening 8 which is axially disposed within the face plate. Also extending radially from opening 8 and passing through grooves 9 are a plurality of uniformly disposed grooves 10. Grooves 9 and 10 provide uniform contact of the core sample with test fluid introduced through opening 8 and preferably include uniformly sized channels. Similarly the grooves provide an effective and uniform passage for fluids or other test media which pass through the core sample and into opening 8. Located around the periphery of the face plate are one or more circumferential buttress grooves 3 and a circumferential recess 4 which has disposed therein a sealing O-ring or gasket 5. As described hereinafter, the grooves 3 and O-ring 5 serve as a means for securing the end plate 1 to the ends of sample when the sample is bonded to a plastic casing.

Opening 8 in face plate 6 extends through the end plate to communicate with an internally threaded passageway or chamber 22. Connecting opening 8 with chamber 22 is an axial passageway surrounded by a conical valve seat 12 internally threaded at 13 and adapted to engage a matchingly threaded portion 14 of valve plug 15, see FIGURE 2.

As shown in FIGURE 2, the conical portion of valve plug 15 is circumferentially grooved to receive an annular sealing O-ring 16 which is adapted to sealingly engage the conical portion of valve seat 12. The sealing ring 16 as well as rings 5, 50 and 58 are formed of any suitable sealing material not affected by the test fluid, such as rubber for example, if the test fluid is water, or any of the well known oil-resistant synthetic rubbers if the test fluid is oil. A nipple 18 which is circular in shape and located at the end of the valve plug 15 is adapted to mate with opening 8, and upon complete threaded engagement of portions 13 and 14, whereby valve plug 15 rests on seat 12, the opening 8 is effectively closed in that fluid holdup is substantially eliminated.

Valve plug 15 is provided with slot 19, as shown in FIGURE 3, adapted to receive a valve stem 33 which is slidably and rotatably mounted within tubular end piece 30. Protruding from the lower portion of the end piece are external threads 34, defining a chamber 32 through which the valve stem 33 moves, and threads 34 are adapted to threadedly engage the matchingly threaded portion of chamber 22 (FIGURE 1) to provide firm interengagement thereof in a unitary assembly. A cover 41 is fixedly placed around stem 33 at the upper portion of end piece 30 and is secured thereto by means of screws 52. As illustrated, the upper end of valve stem 33 extends through a central opening in the cover and is rigidly connected to a handle 39. A shoulder 38 serves to limit the outward movement of valve stem 33 against the cover 41 while a collar 54, which encircles the valve stem between the cover 41 and handle 39, limits the inward movement of the valve stem 33 to engagement with slot 19 of valve plug 15.

In actual operation, when the end plate means 1 are mounted to the test case, fluid communication is controllably established by rotating valve plug 15 so as to move the nipple 18 in or out of engagement with opening 8 in face plate 6. As illustrated in FIGURE 3, opening 8 is effectively closed by reason of the valve plug 15 resting on its seat 12 through complete threaded engagement of portions 13 and 14 and the sealing engagement of O-ring 16 with seat 12. However, when it is desired to establish fluid communication with the test core, the valve stem 33 is moved inwardly into slot 19, which is deep to enable fluid flow therethrough, and rotated by means of handle 39 so as to move the valve plug 15 away from seat 12 by disengagement of threaded portions 13 and 14, and O-ring 16. When unseated, valve plug 15 is kept within a chamber 44 by stem 33 while a ring or gasket 50, annular in shape, and formed of suitable sealing material like rings 5 and 16 above-described, which is retained in an annularly grooved portion 51 of chamber 22, is employed to provide a sealing engagement between chamber 22 and threads 34.

The end piece 30 is provided with one or more lateral ports 56 adapted for being coupled to a source of test fluid, not shown, and it will be observed that when valve plug 15 is unseated, the test fluid will flow from opening 56 through passageway 32 passing through slot 19 of the valve plug 15 in chamber 44, and through the axial passageway surrounding the conical valve seat 12 to opening 8. An upper sealing ring 58 which is circular in shape and similar in all respects to rings 16 and 5 is disposed in an annular groove in shoulder 38 of valve stem 33 so as to provide a tight seal and thus prevent passage of test fluid through the opening in cover 41. In operation, of course, one combination of the end plate 1 and end piece mounted to the core specimen serves as an inlet for test fluid while the other acts as an exit.

In accordance with an embodiment of the method of the present invention for mounting a core sample in an impermeable container, the sample is placed within a snug-fitting casing of impermeable material, e.g. plastic. End closure means of the type described above, which include a face plate and can be adapted to provide uniform distribution of fluid through the sample, are inserted at each of the opposite ends of the casing in a manner to provide face plate contact with the sample. The end plate means and case sample are hermetically seated, subjected to a temperature (e.g. about 100 to 150° C.)—pressure (e.g. 500 lbs.) in an oil bath until the impermeable container is firmly bonded to the sample.

In carrying out the method of this invention a core sample to be tested is placed within a plastic container which fits snugly about the specimen. The container or casing which is employed for sealing the core is usually a plastic material such as Plexiglas or Lucite and is preferably a thermoplastic transparent material, such as Lucite, which permits visual observation of the sample and can be easily machined. In operation, after the sample is placed in the plastic container, each end plate means 1 is inserted so that the grooves 3 and O-ring 5 are completely encased within the plastic material (FIGURE 3). This constitutes an important aspect of the method for mounting the core sample since the resilient ring 5 circumferentially retained about the valve body effectively prevents liquid absorption of the sample during the subsequent bonding operation. In order to set the end plates tightly against the core sample, the plastic casing containing the sample and end plate 1 is evacuated by attaching the end piece means 30 to each of the valve bodies and then connecting the openings 56 to a conduit leading to a vacuum pump. After each end plate is firmly set, the valve plug is then closed against its seat 12, each end piece 30 is removed by being unscrewed from chamber 22, and a suitable screw with Teflon gasket, not shown, is inserted within chamber 22 as an extra precaution to prevent any subsequent entrance of fluid from the oil bath. The plastic enclosed specimen and end plate means 1 are then bonded in an autoclave, e.g. temperature-pressure oil bath.

The specimen is maintained in a temperature-pressure oil bath until the plastic is firmly bonded to the core sample and end plate means 1. The oil bath is maintained under a pressure of about 500 lbs. and a temperature of about 130° C. After sufficient time has elapsed, the bath is cooled, then depressured, and the core sample removed. Afterwards, the resilient ring 5 which is bonded to the plastic is advantageously removed by means of a lathe for example, and the mounted specimen is polished as desired. Thus a lathe can be used to remove the annular portion $x$ of the plastic casing as designated in FIGURE 3 and the O-ring to avoid inaccurate weight determinations due to oil held around ring 5. However, no part of end piece is removed as it is reusable. Specimens with all degrees of hardness and consolidation may be mounted in this manner. The slight strain that is applied to the core sample during bonding is uniform in all directions and is cushioned by the layer of plastic which completely surrounds the sample. The end plates 1 are firmly bonded to the plastic casing by means of buttress grooves 3 which remain after the resilient ring 5 has been removed, and the subsequent passage of fluid through the specimen for various core analyses is limited to passage through the core itself.

In a modification of the face plate illustrated in FIGURE 4, two openings 90 and 91 are provided to emit two different liquids, for example oil and water. Opening 90 communicates with helical groove 95 disposed within face plate 1a while opening 91 communicates with helical groove 96, also disposed within face plate 1a. Helical groove 96 is interjacent and uncommunicative with groove 95. This modification is advantageously employed when the permeable sample is to be tested with two liquids of different gravity to avoid gravity separation of the fluids when the core holder is in a horizontal position and to avoid the tendency of such fluids to flow over each other in proportions other than those originally supplied when the core holder is in a vertical or a horizontol position.

It is claimed:

1. A method for mounting a core specimen with a substantially impermeable casing and non-absorbent, cylindrical end plate closure means for use in fluid flow investigations; said end plate closure means including a circular face plate containing axially located fluid communication means, circumferential buttress grooves around its periphery, and a resilient O-ring mounted to sealingly engage the casing and located in a circumferential recess around its periphery; said method comprising the steps of placing the core specimen snugly within the casing; inserting said closure means, with the buttress-grooved end first, in the opposite ends of the casing in a manner to provide face plate contact with the specimen and the complete encasement of the buttress grooves and the O-ring; evacuating the casing to set the end plates tightly against the core specimen; and bonding the casing enclosed specimen and end plate closure means.

2. The method of claim 1 wherein the O-ring, in the bonded casing enclosed specimen and end plate closure means, is removed.

3. Apparatus comprising a tubular end piece with a first end removably mounted on a cylindrical end plate in a unitary assembly; said tubular end piece having a longitudinal bore extending through the first end and second ends of the end piece, a lateral port communicating with the bore, a stem mounted to slidably reciprocate in the bore and adapted to provide fluid flow between the lateral port and the first end of the bore while fluid sealing the second end of the bore; said end plate having a circular face plate, a back plate, axially disposed fluid communication means through the face and back plates and communicating in a fluid flow relationship with the first end of said bore, a valve seat in the end plate about the communication means, a valve plug cooperable with said seat and with said stem to control fluid flow through said ports, bore and communication means when actuated by said stem.

4. The apparatus of claim 3 wherein the stem in the bore includes an end portion located above the lateral port, the end portion being cylindrical in form and adapted to fit closely in the bore, and having an annular resilient member disposed in a circumferential recess to sealingly engage the bore and prevent fluid passage through the second end of the bore.

5. The apparatus of claim 4 wherein the end plate includes circumferential buttress grooves around its periphery near the face plate and an O-ring located in a circumferential recess around its periphery near the back plate.

6. A method for mounting a core specimen with a substantially impermeable rigid plastic casing and non-absorbent, cylindrical end plate closure means for use in fluid flow investigations; said end plate closure means including a circular face plate containing a centrally-located axially-disposed opening, concentric grooves disposed uniformly therein and extending radially outward from said opening, a plurality of uniformly disposed grooves therein extending radially from the opening and passing through the concentric grooves in a manner to provide an even distribution of fluid flow through the mounted specimen, circumferential buttress grooves around its periphery, and a rubber O-ring mounted to sealingly engage the casing and located in a circumferential recess around its periphery; said method comprising the steps of placing the core specimen snugly within the casing; inserting said closure means, with the buttress-grooved end first, in the opposite ends of the casing in a manner to provide face plate contact with the specimen and the complete encasement of the buttress grooves and the O-ring, evacuating the casing to set the end plates tightly against the core specimen; and bonding the casing enclosed specimen and end plate closure means in a temperature-pressure oil bath.

7. The method of claim 6 wherein the O-ring, in the bonded casing enclosed specimen and end plate closure means, is removed.

8. A method for mounting a core specimen with a substantially impermeable, rigid, plastic casing and non-absorbent, cylindrical end plate closure means for use in fluid flow investigations; said end plate closure means including a circular face plate containing axially-located fluid communication means, the face plate containing two openings as the fluid communication means, each opening communicating with a separate helical groove disposed within the face plate; said helical grooves being interjacent and uncommunicative with each other to enable the testing of the specimen with two liquids of different gravity, circumferential buttress grooves around its periphery, and a rubber O-ring mounted to sealingly engage the casing and located in a circumferential recess around its periphery; said method comprising the steps of placing the core specimen snugly within the casing; inserting said closure means, with the buttress-grooved end first, in the opposite ends of the casing in a manner to provide face plate contact with the specimen and the complete encasement of the buttress grooves and the O-ring evacuating the casing to set the end plates tightly against the core specimen; and bonding the casing enclosed specimen and end plate closure means in a temperature-pressure oil bath.

9. The method of claim 8 wherein the O-ring, in the bonded casing enclosed specimen and end plate closure means, is removed.

10. Apparatus comprising a tubular end piece with the first end removably mounted on a cylindrical end plate in a unitary assembly; said tubular end piece having a longitudinal bore extending through the first end and second end of the end piece, a lateral port communicating with the bore, a stem slidably mounted in the bore and adapted to provide fluid flow between the lateral port and the first end of the bore while fluid sealing the second end of the bore; said end plate having a circular face plate, a back plate, axially disposed fluid communication means through the face and back plates and communicating in a fluid flow relationship with the first end of said bore, a valve seat in the end plate about the communication means, a valve plug cooperable with said seat and with said stem to control fluid flow through said ports, bore and communication means when actuated by said stem; said circular face plate containing circumferential buttress grooves around its periphery, and a resilient O-ring mounted in a circumferential recess around its periphery.

11. Apparatus of claim 10 wherein the face plate contains a centrally located opening as the fluid communication means, concentric grooves disposed uniformly therein and extending radially outward from said opening, and a plurality of uniformly disposed grooves therein extending radially from the opening and passing through the concentric grooves and the O-ring is made of rubber.

12. Apparatus of claim 10 wherein the face plate contains two openings as the fluid communication means, each opening communicating with a separate helical groove disposed within the face plate; said helical grooves being interjacent and uncommunicative with each.

References Cited in the file of this patent

UNITED STATES PATENTS

| | | |
|---|---|---|
| 394,444 | Bixler | Dec. 11, 1888 |
| 1,970,193 | Riebel | Aug. 14, 1934 |
| 2,414,113 | Mapes | Jan. 14, 1947 |
| 2,646,678 | Standing et al. | July 28, 1954 |